United States Patent
Silva

(10) Patent No.: US 10,941,675 B2
(45) Date of Patent: Mar. 9, 2021

(54) MOUNT ASSEMBLY WITH BOLT HEAD LOCK PLATE(S)

(71) Applicant: United Technologies Corporation, Farmington, CT (US)

(72) Inventor: Daniel C. Silva, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 112 days.

(21) Appl. No.: 16/198,233

(22) Filed: Nov. 21, 2018

(65) Prior Publication Data

US 2020/0157973 A1 May 21, 2020

(51) Int. Cl.
*F16B 5/02* (2006.01)
*F01D 25/28* (2006.01)
*F02K 3/04* (2006.01)

(52) U.S. Cl.
CPC ............... *F01D 25/28* (2013.01); *F16B 5/02* (2013.01); *F02K 3/04* (2013.01); *F05D 2220/32* (2013.01); *F05D 2240/90* (2013.01)

(58) Field of Classification Search
CPC ........ F16B 5/02; F16B 5/0208; F16B 37/044; F16B 39/08; F16B 39/10; F16B 39/101; F16B 41/002; Y10S 411/974; Y10S 411/992
USPC ...................................... 411/90–91, 102, 103
See application file for complete search history.

(56) References Cited

U.S. PATENT DOCUMENTS

| | | | |
|---|---|---|---|
| 1,088,515 A * | 2/1914 | Bazin | F16B 39/10 411/120 |
| 1,741,077 A | 12/1929 | Rusack | |
| 2,612,911 A * | 10/1952 | Usry | D03D 49/24 139/158 |
| 3,493,026 A * | 2/1970 | Stotler | F16B 41/002 411/120 |
| 3,747,288 A | 7/1973 | Grimelii | |
| 4,735,533 A | 4/1988 | Gallagher | |
| 4,893,975 A | 1/1990 | Anthony | |
| D305,927 S * | 2/1990 | Linderman | 411/120 |
| 4,906,150 A | 3/1990 | Bennett | |
| 4,943,013 A | 7/1990 | Kapala et al. | |
| 6,439,616 B1 | 8/2002 | Karafillis | |
| 7,213,890 B2 * | 5/2007 | Porter | B60B 27/06 301/105.1 |

(Continued)

FOREIGN PATENT DOCUMENTS

DE 2724333 C3 8/1980
GB 2452232 A 4/2007

OTHER PUBLICATIONS

EP search report for EP19210775.3 dated Apr. 15, 2020.

*Primary Examiner* — Roberta S Delisle
(74) *Attorney, Agent, or Firm* — Getz Balich LLC

(57) ABSTRACT

A bolt lock plate includes a plate configured with a multi-point aperture and a slot. The multi-point aperture has an axial centerline and a cross-sectional geometry with a quantity N of points arranged about the axial centerline. The slot extends circumferentially about the axial centerline a quantity M of degrees within the plate and between opposing ends of the slot. The quantity M is at least substantially equal to three-hundred and sixty divided by a product of the quantity N and a constant C. The constant C is equal to one or two.

19 Claims, 10 Drawing Sheets

(56) References Cited

U.S. PATENT DOCUMENTS 7,731,463 B2 * 6/2010 Davis .................. F16B 39/10
411/119
8,561,501 B2 * 10/2013 Niggemeier ............ F02C 7/32
74/606 R

* cited by examiner

MOUNT ASSEMBLY WITH BOLT HEAD LOCK PLATE(S)

BACKGROUND OF THE DISCLOSURE

Technical Field

This disclosure relates generally to a mount assembly and, more particularly, to a device/assembly for limiting and/or preventing rotation of a fastener.

Background Information

An apparatus such as a gas turbine engine is subject to vibrations during operation. These vibrations may cause certain mounting bolts on, for example, an engine case to at least partially backout/loosen. Various devices and assemblies are known in the art for preventing or limiting the backing out/loosening of mounting bolts during engine operation. While these various known devices and assemblies have advantages, there is still room in the art for improvement.

There is a need in the art for improved devices and assemblies for limiting and/or preventing rotation of a fastener.

SUMMARY OF THE DISCLOSURE

According to an aspect of the present disclosure, a bolt lock plate is provided that includes a plate configured with a multi-point aperture and a slot. The multi-point aperture has an axial centerline and a cross-sectional geometry with a quantity N of points arranged about the axial centerline. The slot extends circumferentially about the axial centerline a quantity M of degrees within the plate and between opposing ends of the slot. The quantity M is at least substantially equal to three-hundred and sixty divided by a product of the quantity N and a constant C. The constant C is equal to one or two.

According to another aspect of the present disclosure, a mount assembly is provided that includes a body, a bolt, a lock plate and a fastener. The body is configured with a bolt hole. The bolt includes a multi-point head and a shaft mated with the bolt hole. The lock plate is configured with a multi-point aperture and a slot. The multi-point aperture receives the multi-point head. The slot extends circumferentially about a centerline of the multi-point aperture within the lock plate. The fastener projects through the slot and fixed to the body.

According to still another aspect of the present disclosure, a mount assembly is provided for a turbine engine. This mount assembly includes a body, a first bolt, a second bolt, a first lock plate, a second lock plate and a fastener. The body is configured with a first bolt hole and a second bolt hole. The first bolt includes a first multi-point head and a first shaft mated with the first bolt hole. The second bolt includes a second multi-point head and a second shaft mated with the second bolt hole. The first lock plate is configured with a first multi-point aperture and a first lock aperture. The first multi-point aperture receives the first multi-point head. The second lock plate is configured with a second multi-point aperture and a second lock aperture. The second multi-point aperture receives the second multi-point head. The fastener projects through the first lock aperture and the second lock aperture. The fastener is attached to the body.

The constant C may be equal to one. Alternatively, the constant C may be equal to two.

The cross-sectional geometry may be a polygonal cross-sectional geometry.

The cross-sectional geometry may be a bi-hexagonal cross-sectional geometry.

The quantity M may be equal to between twenty-nine and thirty-one.

A first of the points may be circumferentially aligned with a center of the slot about the axial centerline.

A second bolt and a second lock plate may be included. The second bolt may include a second multi-point head and a second shaft mated with a second bolt hole in the body. The second lock plate may be configured with a second multi-point aperture and a second slot. The second multi-point aperture may receive the second multi-point head. The second slot may extend circumferentially about a centerline of the second multi-point aperture within the second lock plate. The fastener may further project through the second slot.

The second lock plate may be a mirror image of the lock plate.

The multi-point aperture may have a cross-sectional geometry perpendicular to the centerline with a quantity N of points arranged circumferentially about the centerline. The slot may extend circumferentially about the centerline a quantity M of degrees within the lock plate. The quantity M may be at least substantially equal to three-hundred and sixty divided by the quantity N.

A first of the points may be circumferentially aligned with a center of the slot about the centerline.

The multi-point aperture may have a cross-sectional geometry perpendicular to the centerline with a quantity N of points arranged circumferentially about the centerline. The slot may extend circumferentially about the centerline a quantity M of degrees within the lock plate. The quantity M may be at least substantially equal to three-hundred and sixty divided by a product of the quantity N and two.

The multi-point aperture may have a bi-hexagonal cross-sectional geometry.

The fastener may compress the lock plate towards the body to prevent rotation of the lock plate.

The body may be configured with a fastener aperture and a channel on a first side of the body. The multi-point head may be adjacent a second side of the body. The fastener may include a lock bolt and a nut mated with the lock bolt. The lock bolt may include a lock bolt head and a lock bolt shaft. The lock bolt head may be mated with the channel. The lock bolt shaft may project out from the lock bolt head and sequentially through the fastener aperture and the slot to the nut.

A turbine engine case and a mounting bracket may be included. The turbine engine case may include a boss. The mounting bracket may be between the boss and the body. The bolt may attach the mounting bracket to the boss.

The first lock aperture may have a circular cross-sectional geometry.

The first lock aperture may be configured as a slot that extends circumferentially about a centerline of the first multi-point aperture within the first lock plate.

The first multi-point aperture may have a cross-sectional geometry with a quantity N of points arranged circumferentially about the centerline. The slot may extend circumferentially about the centerline a quantity M of degrees within the first lock plate. The quantity M may be at least substantially equal to three-hundred and sixty divided by a product of the quantity N and a constant C. The constant C may be equal to one or two.

The foregoing features and the operation of the invention will become more apparent in light of the following description and the accompanying drawings.

DETAILED DESCRIPTION

Figure 1:
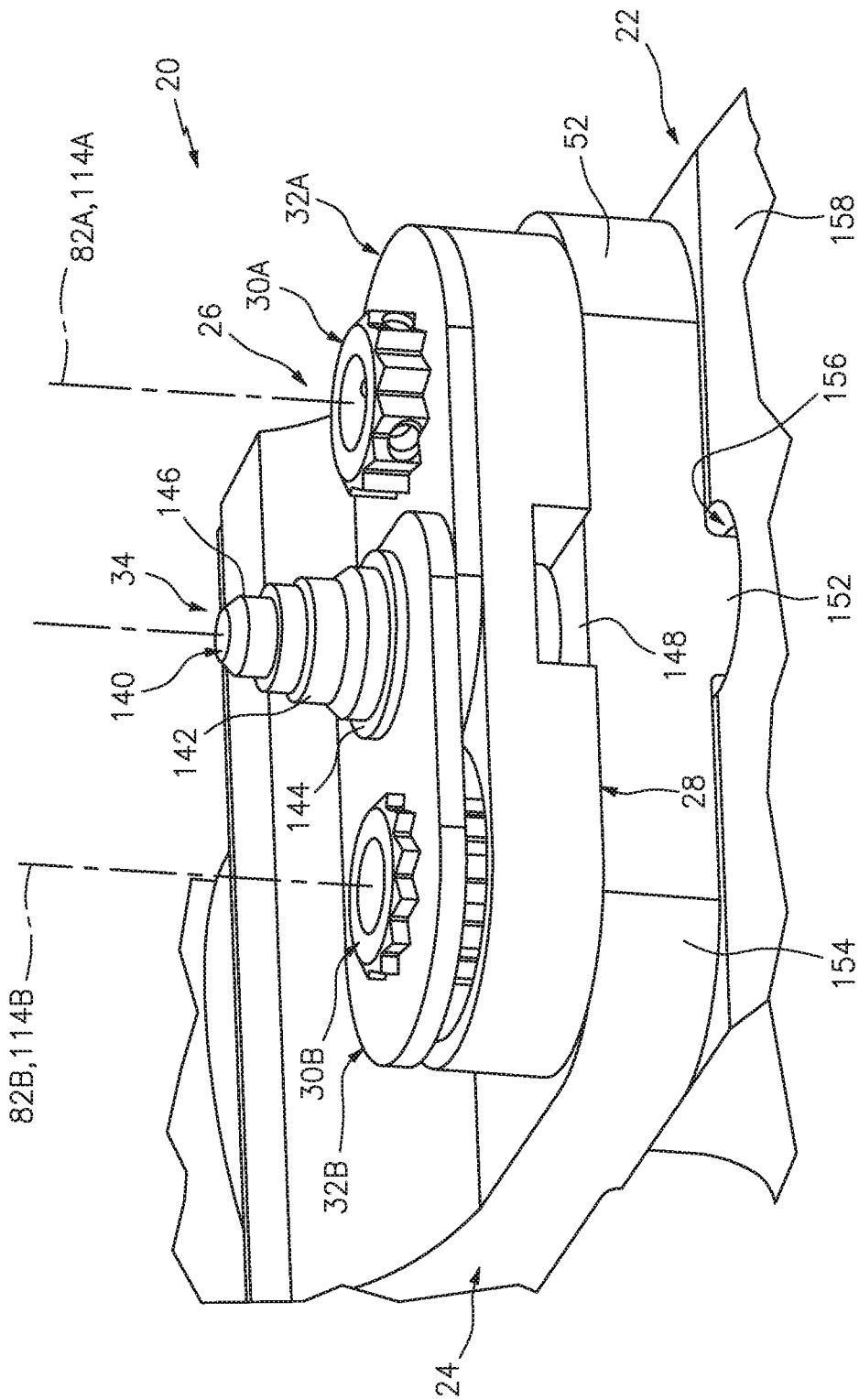
FIG. 1 is a partial perspective illustration of a mount assembly for a device such as a gas turbine engine.
Figure 2:
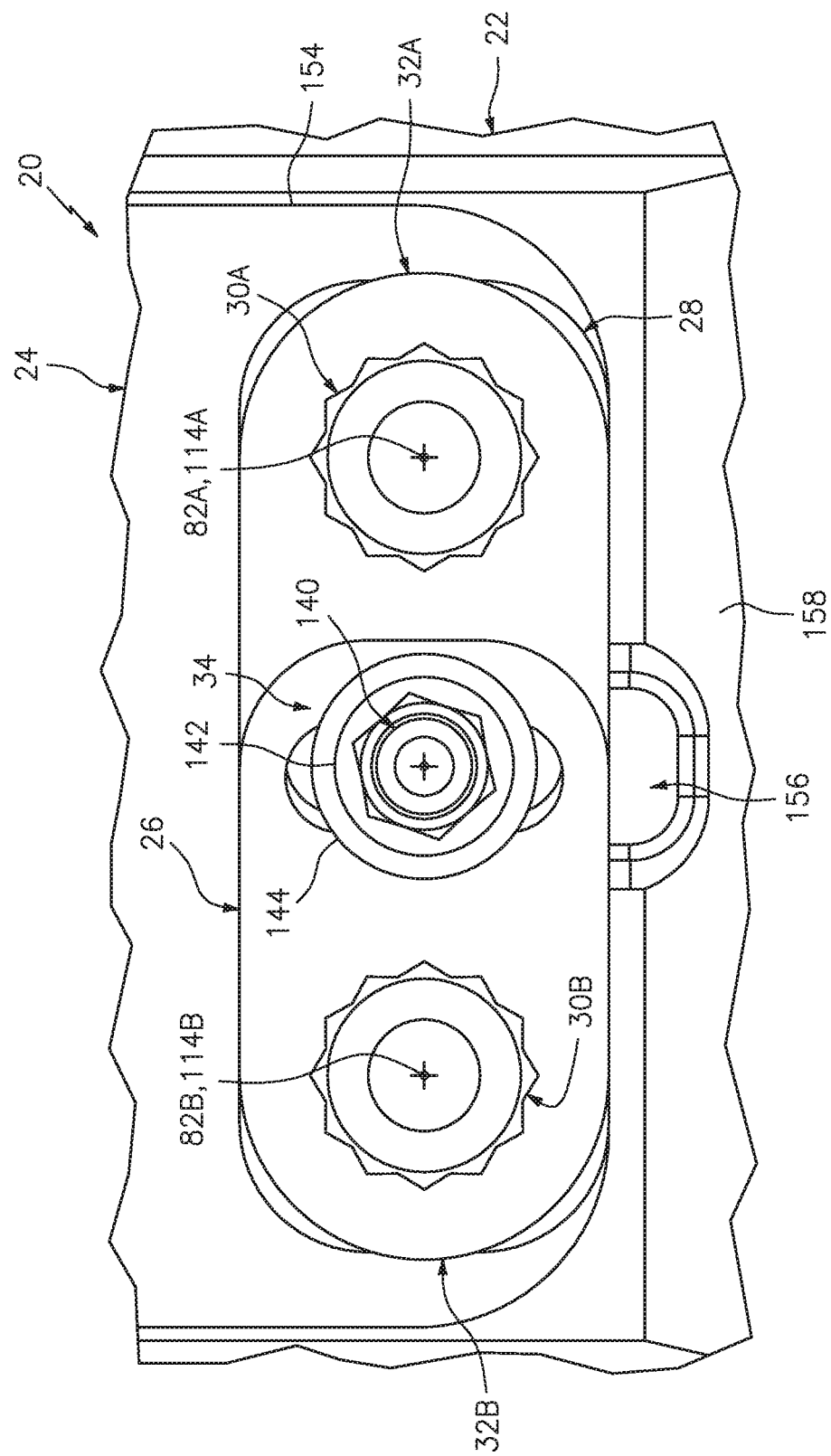
FIG. 2 is a partial illustration of an exterior side of the mount assembly.
Figure 3:
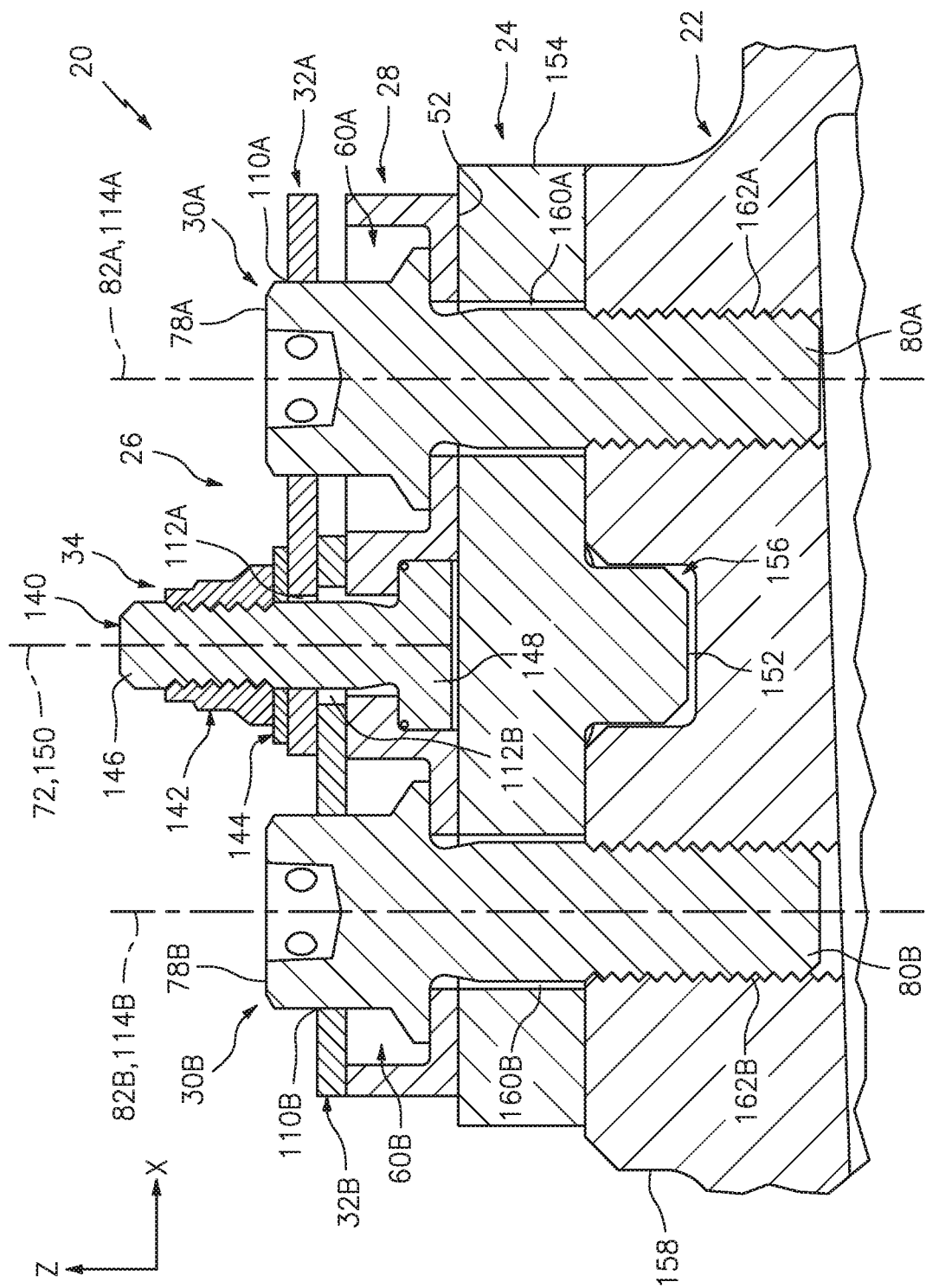
FIG. 3 is a partial side sectional illustration of the mount assembly.

FIGS. 1-3 illustrate a mount assembly 20 for an apparatus such as, but not limited to, a gas turbine engine. The mount assembly 20 includes a first component 22 (e.g., a turbine engine case), a second component 24 (e.g., an accessory gearbox mounting bracket) and a fastener assembly 26.

The fastener assembly 26 is configured to mount the second component 24 to the first component 22 as described below in further detail. The fastener assembly 26 of FIGS. 1-3 includes a body such as a base bracket 28, one or more bolts 30A and 30B (referred to generally as "30"), one or more lock plates 32A and 32B (generally referred to as "32") and a lock fastener 34.

Figure 4:
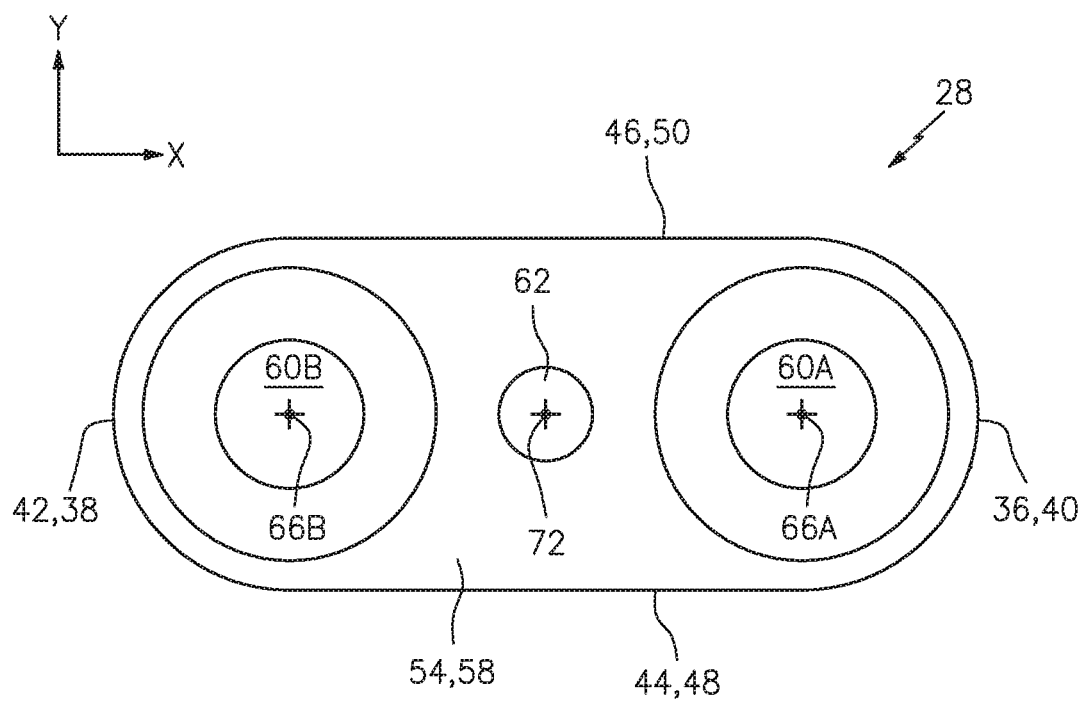
FIG. 4 is an illustration of an exterior side of a base bracket for the mount assembly.
Figure 5:
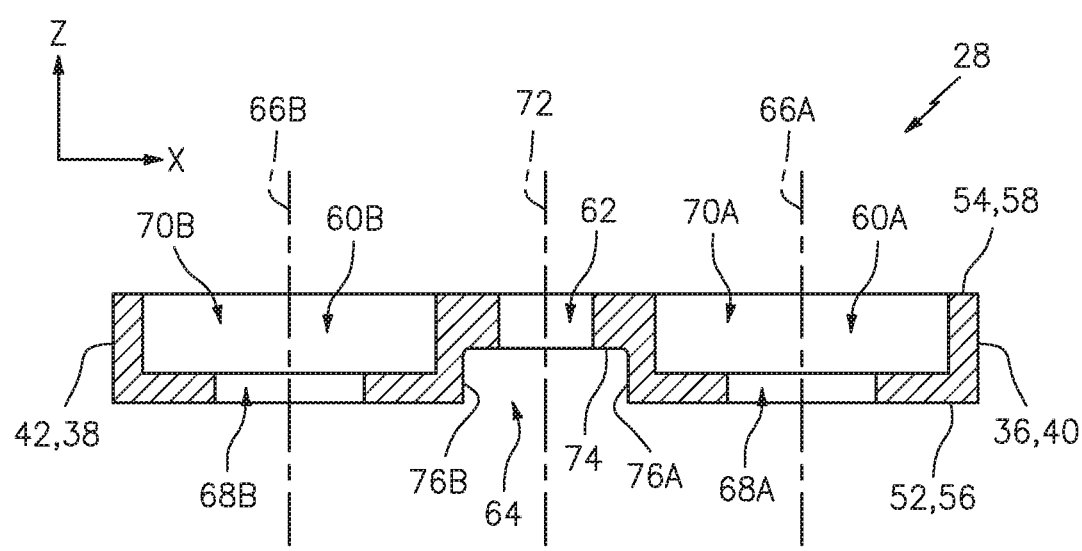
FIG. 5 is a side sectional illustration of the base bracket.

Referring to FIGS. 4 and 5, the base bracket 28 extends longitudinally (e.g., along an x-axis) between opposing base bracket longitudinal sides 36 and 38. Each of these longitudinal sides 36, 38 may be defined by a respective curved (e.g., semi-circular) side surface 40, 42 of the base bracket 28. The base bracket 28 extends laterally (e.g., along a y-axis) between opposing base bracket lateral sides 44 and 46. Each of these lateral sides 44, 46 may be defined by a respective flat side surface 48, 50 of the base bracket 28, which flat side surface 48, 50 extends longitudinally between respective ends of the curved side surfaces 40 and 42. The base bracket 28 extends vertically (e.g., along a z-axis) between opposing base bracket vertical ends 52 and 54. Each of these vertical ends 52, 54 may be defined by a respective (e.g., flat) end surface 56, 58, which end surface 56, 58 extends longitudinally between respective ends of the curved side surfaces 40 and 42 and laterally between respective ends of the flat side surfaces 48 and 50.

The base bracket 28 is configured with one or more discrete holes. The base bracket 28 of FIGS. 4 and 5, for example, is configured with one or more bolt holes 60A and 60B (generally referred to as "60") and a lock fastener aperture 62. The base bracket 28 may also be configured with a lock channel 64.

The first bolt hole 60A has an axial centerline 66A. The first bolt hole 60A extends along the centerline 66A vertically through the base bracket 28 between the end surfaces 56 and 58. The first bolt hole 60A of FIGS. 4 and 5 includes a first bore 68A and a first counter bore 70A. The first bore 68A extends vertically into the base bracket 28 from the first end surface 56 to a first annular shelf at an intersection between the first bore 68A and the first counter bore 70A. The first counter bore 70A extends vertically into the base bracket 28 from the second end surface 58 to the first annular shelf.

The second bolt hole 60B has an axial centerline 66B. The second bolt hole 60B extends along the centerline 66B vertically through the base bracket 28 between the end surfaces 56 and 58. The second bolt hole 60B of FIGS. 4 and 5 includes a second bore 68B and a second counter bore 70B. The second bore 68B extends vertically into the base bracket 28 from the first end surface 56 to a second annular shelf at an intersection between the second bore 68B and the second counter bore 70B. The second counter bore 70B extends vertically into the base bracket 28 from the second end surface 58 to the second annular shelf.

The fastener aperture 62 is arranged longitudinally (along the x-axis) between the first bolt hole 60A and the second bolt hole 60B. The fastener aperture 62 has an axial centerline 72, which may be substantially parallel the centerlines 66A and 66B. The fastener aperture 62 extends vertically through the base bracket 28 from the second end surface 58 to a channel end surface 74.

The lock channel 64 extends vertically into the base bracket 28 from the first end surface 56 to the channel end surface 74. The lock channel 64 extends laterally through (or within) the base bracket 28 between the flat side surfaces 48 and 50. The lock channel 64 extend longitudinally within the base bracket 28 between opposing (e.g., flat) channel side surfaces 76A and 76B, which side surfaces 76A and 76B respectively extend vertically between the channel end surface 74 and the first end surface 56.

Figure 6:
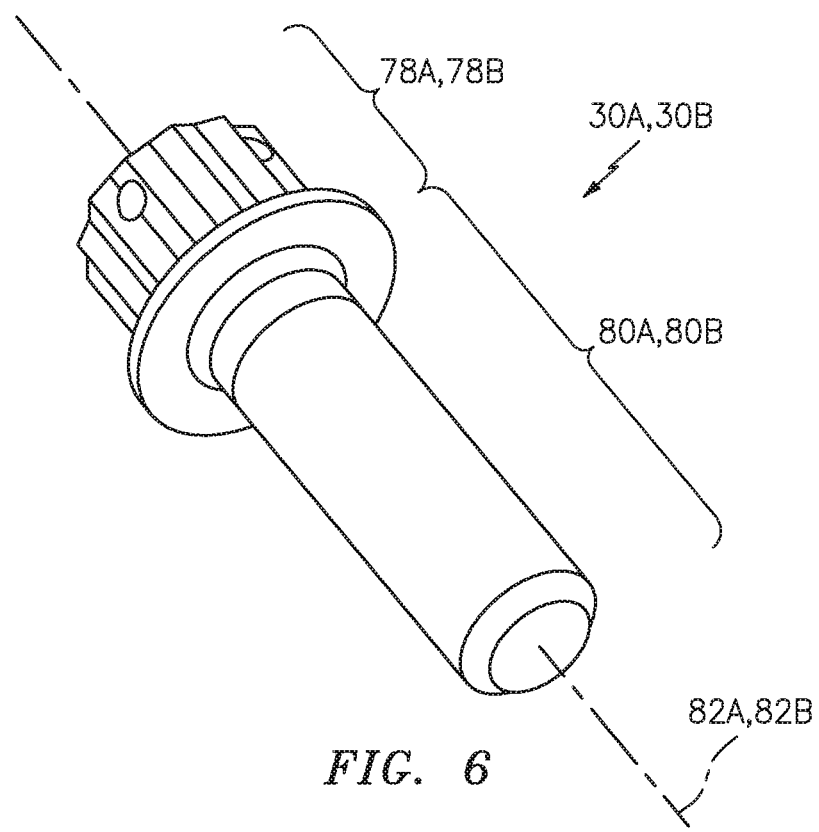
FIG. 6 is a perspective illustration of a bolt for the mount assembly.
Figure 7:
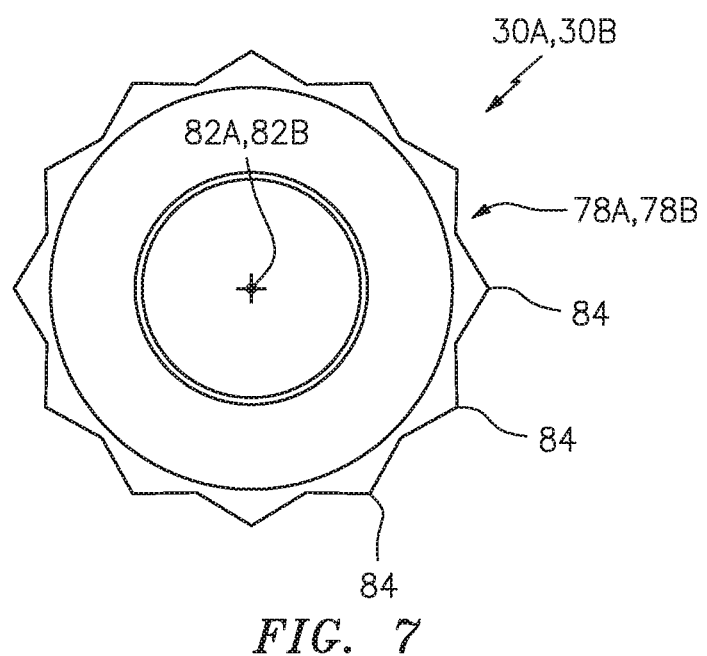
FIG. 7 is an illustration of a head of the bolt.

Referring to FIGS. 6 and 7, each of the bolts 30 is configured with a respective bolt head 78A, 78B (generally referred to as "78") and a respective bolt shaft 80A, 80B (generally referred to as "80"). The bolt head 78 may be configured as a multi-point bolt head. The bolt head 78 of FIG. 7, for example, is configured with a polygonal cross-sectional geometry when viewed in a plane (e.g., x-y plane) perpendicular to an axial centerline 82A, 82B (generally referred to as "82") of the bolt 30. This polygonal cross-sectional geometry may be a bi-hexagonal cross-sectional geometry (e.g., the bolt head may be a 12 point bolt head) as shown in FIG. 7. In other embodiments, however, the polygonal cross-sectional geometry may alternatively be a hexagonal cross-sectional geometry (e.g., the bolt head may be a 6 point bolt head), or any other suitable cross-sectional geometry. The bolt head 78 of FIG. 7 is configured with a plurality of points 84 (e.g., peaks) arranged circumferentially about its centerline 82. Each of these points 84 is formed at a respective radially outer intersection between two circumferentially adjacent surfaces of the bolt head 78.

In the embodiment of FIG. 7, each point 84 is relatively sharp. However, in other embodiments, one or more of the points 84 may alternatively be, for example, slightly rounded.

The bolt shaft 80 is connected to and projects vertically out from the bolt head 78 along its centerline 82 to a distal end. At least a portion of the bolt shaft 80 is threaded.

Figure 8:
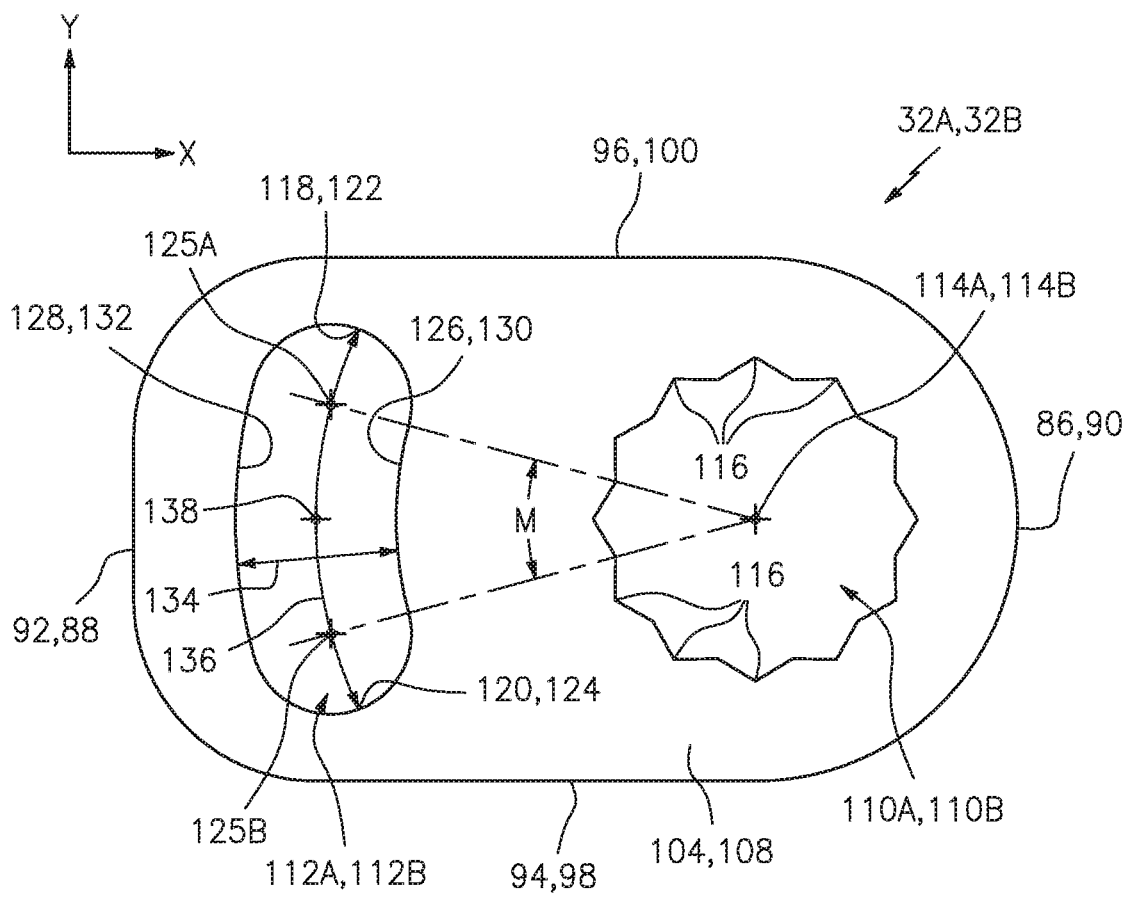
FIG. 8 is an illustration of an exterior side of a bolt head lock plate for the mount assembly.
Figure 9:
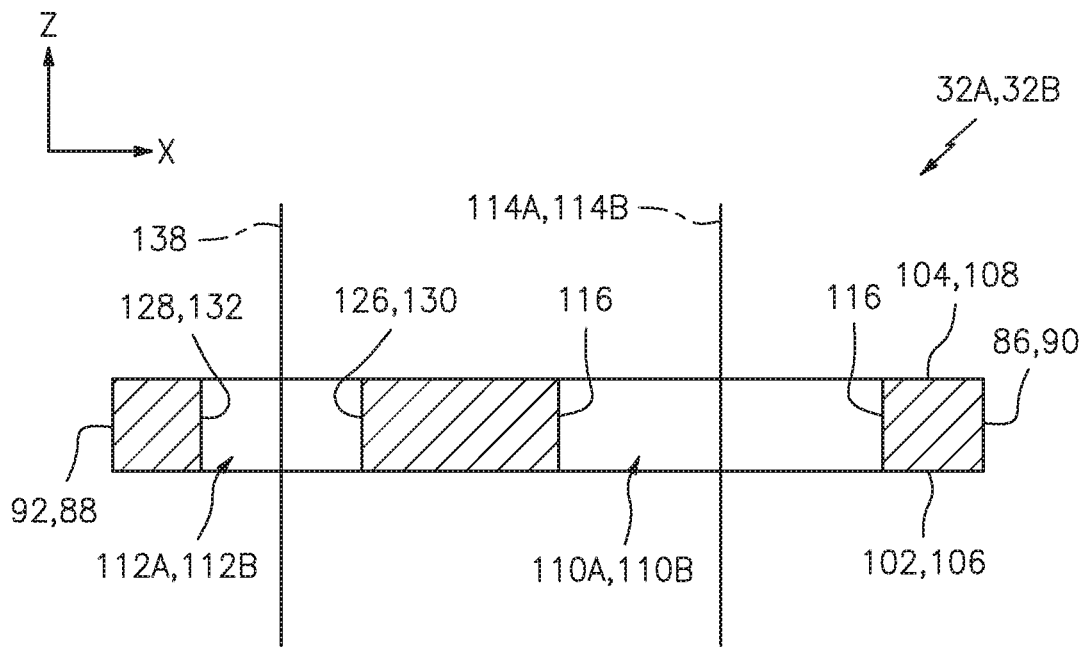
FIG. 9 is a side sectional illustration of the bolt head lock plate.

Referring to FIGS. 8 and 9, each of the lock plates 32 extends longitudinally between opposing lock plate longitudinal sides 86 and 88. The first longitudinal side 86 may be defined by a curved (e.g., semi-circular) side surface 90 of the lock plate 32. The second longitudinal side 88 may be defined by a semi-curved side surface 92 of the lock plate 32, which semi-curved surface 92 may include a flat portion between a pair of rounded portions for example. Each lock plate 32 extends laterally between opposing lock plate lateral sides 94 and 96. Each of these lateral sides 94, 96 may be defined by a respective flat side surface 98, 100 of the lock plate 32, which flat side surface 98, 100 extends longitudinally between respective ends of the side surfaces 90 and 92. Each lock plate 32 extends vertically between opposing lock plate vertical ends 102 and 104. Each of these vertical ends 102, 104 may be defined by a respective (e.g., flat) end surface 106, 108, which end surface 106, 108 extends longitudinally between respective ends of the side surfaces 90 and 92 and laterally between respective ends of the flat side surfaces 98 and 100.

Each of the lock plates 32 is configured with a multi-point aperture 110A, 110B (generally referred to as "110") and a lock aperture 112A, 112B (generally referred to as "112"). The multi-point aperture 110 is located proximate the first longitudinal side 86 and about midway between the lateral sides 94 and 96. The lock aperture 112 is located proximate the second longitudinal side 88 between the lateral sides 94 and 96.

The multi-point aperture 110A, 110B has an axial centerline 114A, 114B (generally referred to as "114"). The multi-point aperture 110 extends vertically through the lock plate 32 along its centerline 114. The multi-point aperture 110 of FIG. 8 is configured with a polygonal cross-sectional geometry when viewed in a plane (e.g., x-y plane) perpendicular to the centerline. This polygonal cross-sectional geometry has substantially the same shape and size as the polygonal cross-sectional geometry of a respective one of the bolt heads 78 such the multi-point aperture 110 conforms to and is operable to receive the bolt head 78 when assembled (e.g., see FIGS. 1-3). For example, the polygonal cross-sectional geometry of FIG. 8 is a bi-hexagonal cross-sectional geometry (e.g., a 12 point aperture). In other embodiments, however, the polygonal cross-sectional geometry may alternatively be a hexagonal cross-sectional geometry (e.g., a 6 point aperture), or any other suitable cross-sectional geometry. The multi-point aperture 110 of FIG. 8 is configured with a quantity N of points 116 (e.g., aperture peaks, lock plate concavities) arranged circumferentially about its centerline 114, which quantity N may be a non-zero integer; e.g., the quantity N is equal to 12 in the embodiment of FIG. 8. Each of these points 116 is formed at a respective radially outer intersection between two circumferentially adjacent interior surfaces of the lock plate 32. In the embodiment of FIG. 8, each point 116 is relatively sharp. However, in other embodiments, one or more of the points 116 may alternatively be, for example, slightly rounded.

The lock aperture 112 extends vertically through the lock plate 32. The lock aperture 112 may be configured as a curved slot. The lock aperture 112 of FIG. 8, for example, extends circumferentially about the centerline 114 of the multi-point aperture 110 a quantity M of degrees within the lock plate 32 and between opposing circumferential ends 118 and 120 of the lock aperture 112. These circumferential ends 118 and 120 may each be defined by a respective interior concave (e.g., semi-circular) end surface 122, 124 of the lock plate 32. In FIG. 8, the quantity M of degrees is measured relative to centers 125A and 125B of the end surfaces 122 and 124; however, in other embodiments, the quantity M of degrees may be measured relative to the ends 118 and 120. The lock aperture 112 extends radially relative to the centerline 114 of the multi-point aperture 110 within the lock plate 32 between opposing radial sides 126 and 128 of the lock aperture 112. The inner radial side 126 may be defined by an interior convex end surface 130 of the lock plate 32. The outer radial side 128 may be defined by an interior concave end surface 132 of the lock plate 32. In the embodiment of FIG. 8, the lock aperture 112 has a (e.g., constant) radial width 134 and a circumferential length 136 that is longer than the radial width 134.

The lock aperture 112 may be configured such that the quantity M is at least substantially (+/−1°) or exactly equal to three-hundred and sixty divided by a product of the quantity N and a constant C; e.g., see equation below:

$$\text{quantity } M \approx \frac{360}{(\text{quantity } N * \text{constant } C)}$$

In the embodiment of FIG. 8, the constant C is equal to two. However, the present disclosure is not limited to a constant of two. For example, in other embodiments (e.g., see FIG. 12), the constant may be equal to one.

In the embodiment of FIG. 8, a circumferential center 138 of the lock aperture 112 is circumferentially aligned with one of the points 116 of the multi-point aperture 110. The present disclosure, however, is not limited to such a lock aperture-multi-point aperture arrangement. For example, in other embodiments (e.g., see FIG. 12), the circumferential center 138 of the lock aperture 112 may be circumferentially offset from (mis-aligned with) each point 116 of the multi-point aperture 110.

Each lock plate 32 may be manufactured from a flat sheet of sheet metal. However, the present disclosure is not limited to any particular lock plate manufacturing techniques or materials.

The lock plates 32 of FIGS. 1-3 have common configurations (e.g., shapes and sizes). More particularly, the second lock plate 32B of FIGS. 1-3 is a mirror image of the first lock plate 32A. The present disclosure, however, is not limited to lock plates with common configurations.

Referring to FIGS. 1-3, the lock fastener 34 includes a bolt 140 and a nut 142. The lock fastener 34 of FIGS. 1-3 also includes a washer 144.

Figure 10:
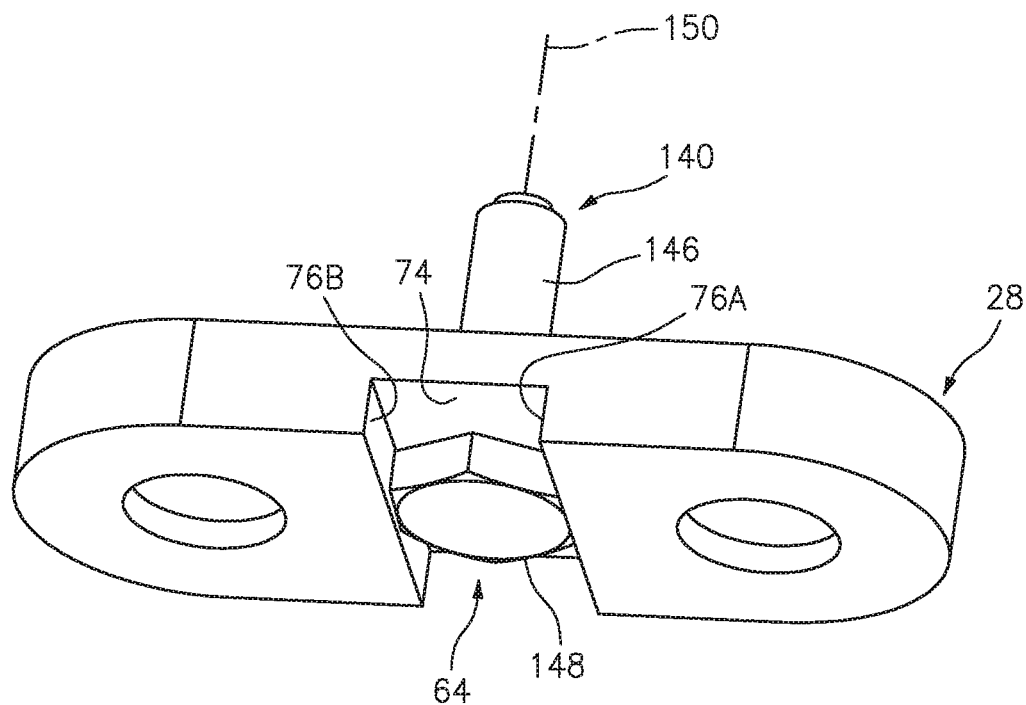
FIG. 10 is a perspective illustration of a lock fastener bolt mated with the base bracket.

During assembly, the lock fastener bolt 140 is mated with the base bracket 28 as shown in FIG. 10. More particularly, a shaft 146 of the lock fastener bolt 140 is inserted into and projects vertically through the fastener aperture 62 (see FIG. 4) such that a head 148 (e.g., a hexagonal/6 point head) of the lock fastener bolt 140 is within the lock channel 64. Within the lock channel 64, opposing flat sides of the head 148 are respectively adjacent and substantially parallel with the channel side surfaces 76A and 76B. The channel side surfaces 76A and 76B are therefore operable as anti-rotation features/stops to prevent or limit rotation of the lack fastener bolt 140 about its centerline 150.

Referring to FIG. 3, the second component 24 is arranged with the first component 22. For example, a projection 152 on a flange 154 of the second component 24 is mated with (inserted into) a groove 156 in a boss 158 of the first component 22. The base bracket 28 is arranged with the second component 24 such that the flange 154 is vertically between the first vertical end 52 of base bracket 28 and the boss 158. With this arrangement, the head 148 of the lock fastener bolt 140 is captured vertically between the base bracket 28 and the second component 24.

The bolt shaft 80A of first bolt 30A is inserted into and projects vertically through the first bolt hole 60A and a respective bolt hole 160A in the second component 24. This bolt shaft 80A is then threaded into a respective threaded bolt hole 162A in the first component 22. Similarly, the bolt shaft 80B of second bolt 30B is inserted into and projects vertically through the second bolt hole 60B and a respective bolt hole 160B in the second component 24. This bolt shaft 80B is then threaded into a respective threaded bolt hole 162B in the first component 22. The first and the second bolts 30A and 30B may then be tightened/torqued to specification, thereby mounting the second component 24 to the first component 22.

The first lock plate 32A is mated with the first bolt 30A and the lock fastener bolt 140. More particularly, the bolt head 78A of the first bolt 30A is inserted within and projects through the first multi-point aperture 110A and the shaft 146 of the lock fastener bolt 140 is inserted within and projects through the first lock aperture 112A. Similarly, the second lock plate 32B is mated with the second bolt 30B and the lock fastener bolt 140. More particularly, the bolt head 78B of the second bolt 30B is inserted within and projects through the second multi-point aperture 110B and the shaft 146 of the lock fastener bolt 140 is inserted within and projects through the second lock aperture 112B. In the arrangement of FIG. 3, the second lock plate 32B is vertically between the first lock plate 32A and the base bracket 28; however, in other embodiments the first lock plate 32A may be vertically between the second lock plate 32B and the base bracket 28.

To secure the lock plates 32, the washer 144 is mated with the shaft 146 of the lock fastener bolt 140. The nut 142 is subsequently threaded onto the shaft 146 of the lock fastener bolt 140 and tightened/torqued to specification. In some embodiments, the nut 142 may be tightened to a torque sufficient to reduce likelihood of or prevent movement (rotation) of the lock plates 32. In other words, the nut 142 may be tightened such that the fastener 34 compresses the lock plates 32 towards the base bracket 28 to increase static friction between the nut 142 and the second lock plate 32B and to increase static friction between the lock plates 32A and 32B.

Figure 11:
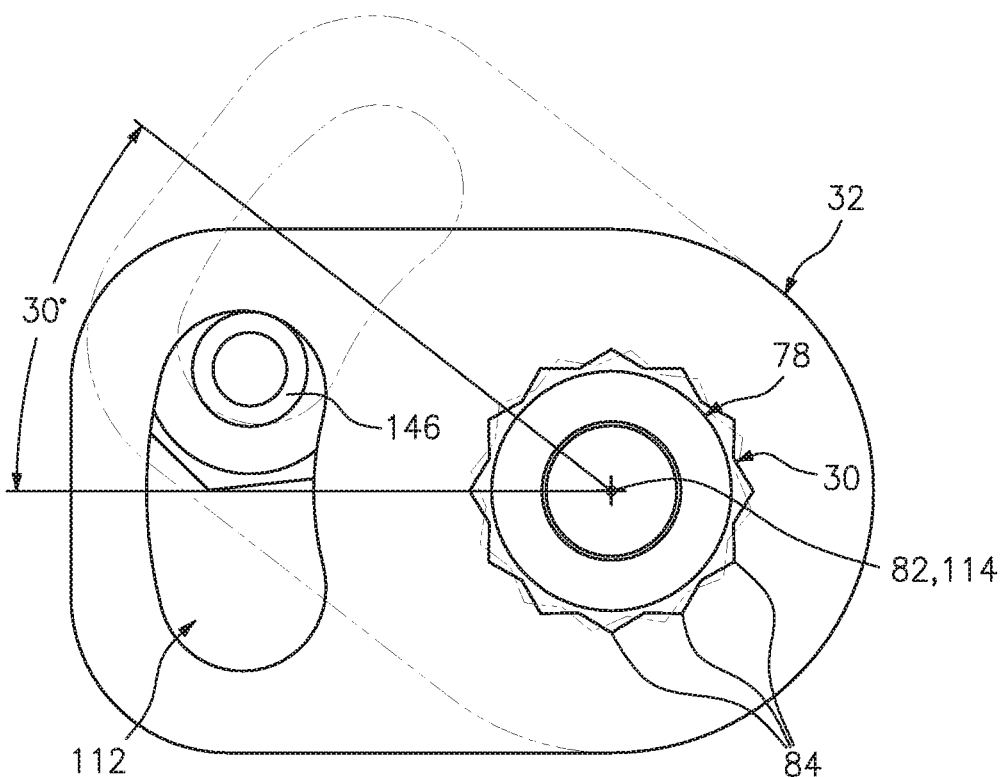
FIG. 11 is an illustration depicting the bolt head lock plate at two different rotational orientations with respect to the lock fastener bolt.

It is worth noting, the lock aperture 112 in each lock plate 32 is configured such that the lock fastener bolt 140 may be inserted into the lock aperture 112 regardless of the specific rotational orientation of the respective bolt head 30. For example, referring to FIG. 11, a 12 point bolt head (e.g., 78) typically has a 30 degree angle between each circumferentially adjacent pair of points (e.g., 84). An angle between the lock fastener bolt 140 and closest one of the bolt head points 84 will thereby always be equal to or less than +/−15 degrees. The lock aperture therefore can be configured to accommodate any rotational orientation of the bolt head 78 where the quantity M is at least equal to about thirty. Alternatively, the quantity M may be at least half of thirty (about fifteen; e.g., see FIG. 12) where the lock plate 32 may be flipped over to accommodate bolt head rotational in opposite directions. This rotational accommodation enables the bolts 30 to be torqued without regard to the resulting rotational orientation of the bolt head 78.

Figure 12:
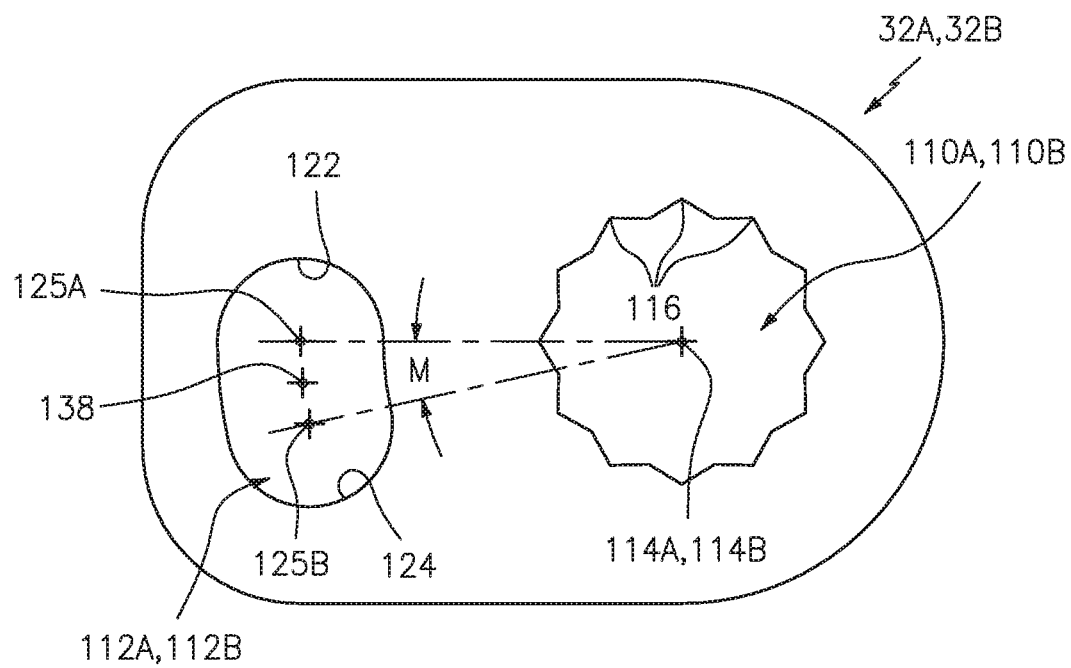
FIG. 12 is an illustration of an exterior side of another bolt head lock plate for the mount assembly.

Referring to FIG. 12, in some embodiments, the constant C may be equal to two. In such embodiments, the center 125A, 125B of each concave end surface 122, 124 may be circumferentially aligned with a respective point 116 in the multi-point aperture 110.

Figure 13:
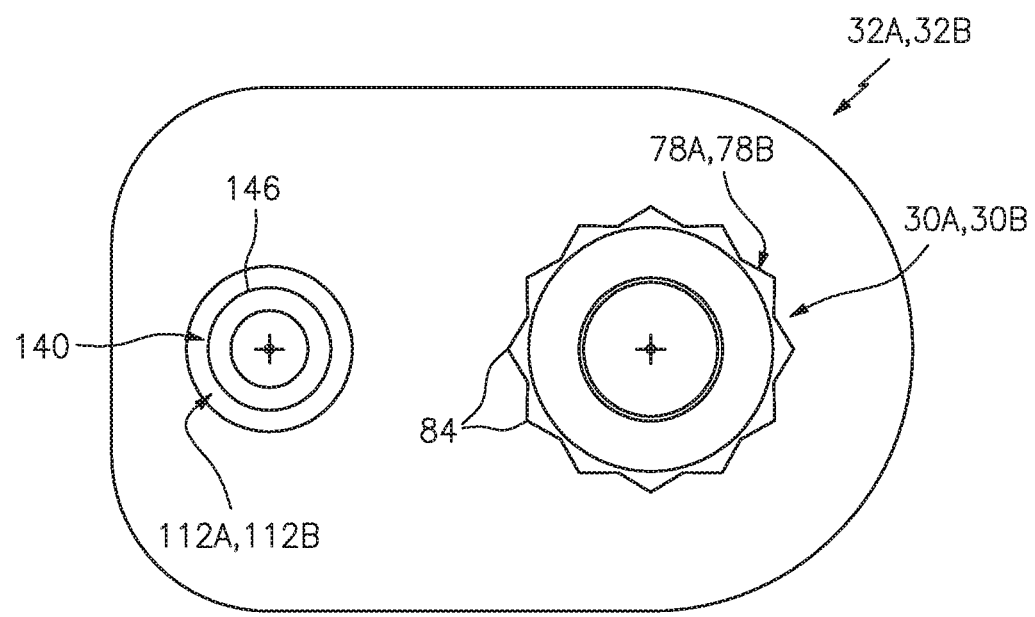
FIG. 13 is an illustration of an exterior side of another bolt head lock plate for the mount assembly configured with the bolt and the lock fastener bolt.
Figure 14:
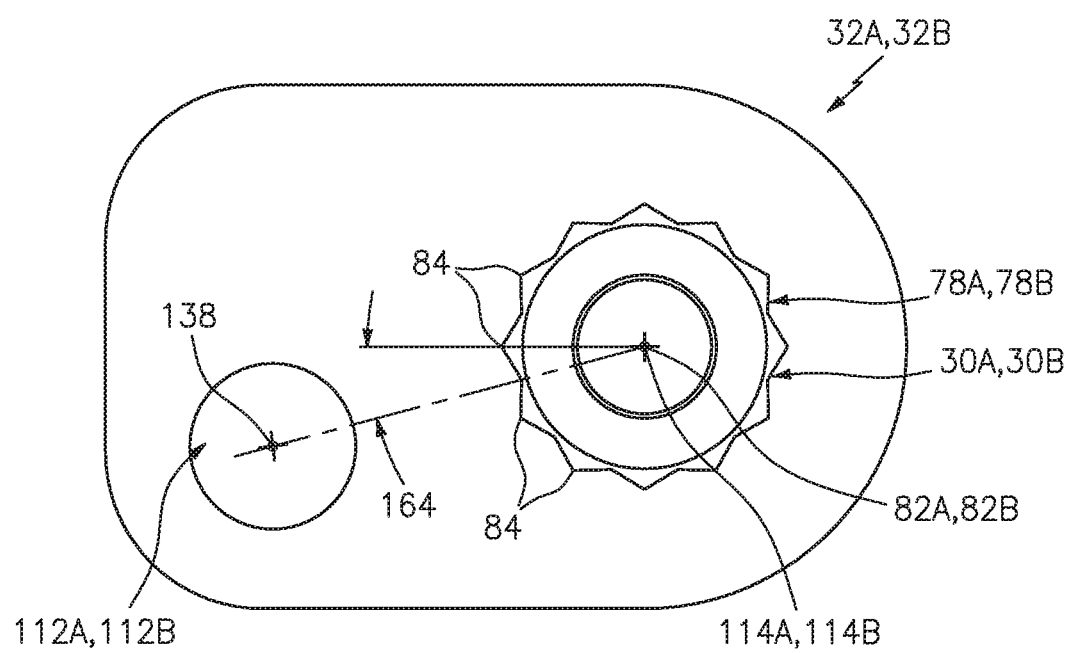
FIG. 14 is an illustration of an exterior side of still another bolt head lock plate for the mount assembly configured with the bolt.

The lock aperture 112 may be configured as a slot as described above. Alternatively, the lock aperture 112 may be configured as a circular hole as illustrated, for example, in FIGS. 13 and 14. A diameter of the lock aperture 112 may be larger than a diameter of the shaft 146 of the lock fastener bolt 140 to enable a certain degree of mis-alignment between a bolt head point 84 and the lock fastener 34. In addition or alternatively, the center 138 of the lock aperture 112 may be circumferentially offset by an offset angle 164 (e.g., 15 degrees +/−1 degree) from a closest one of the points 84 to further accommodate a certain degree of mis-alignment between the bolt head point 84 and the lock fastener 34.

Figure 15:
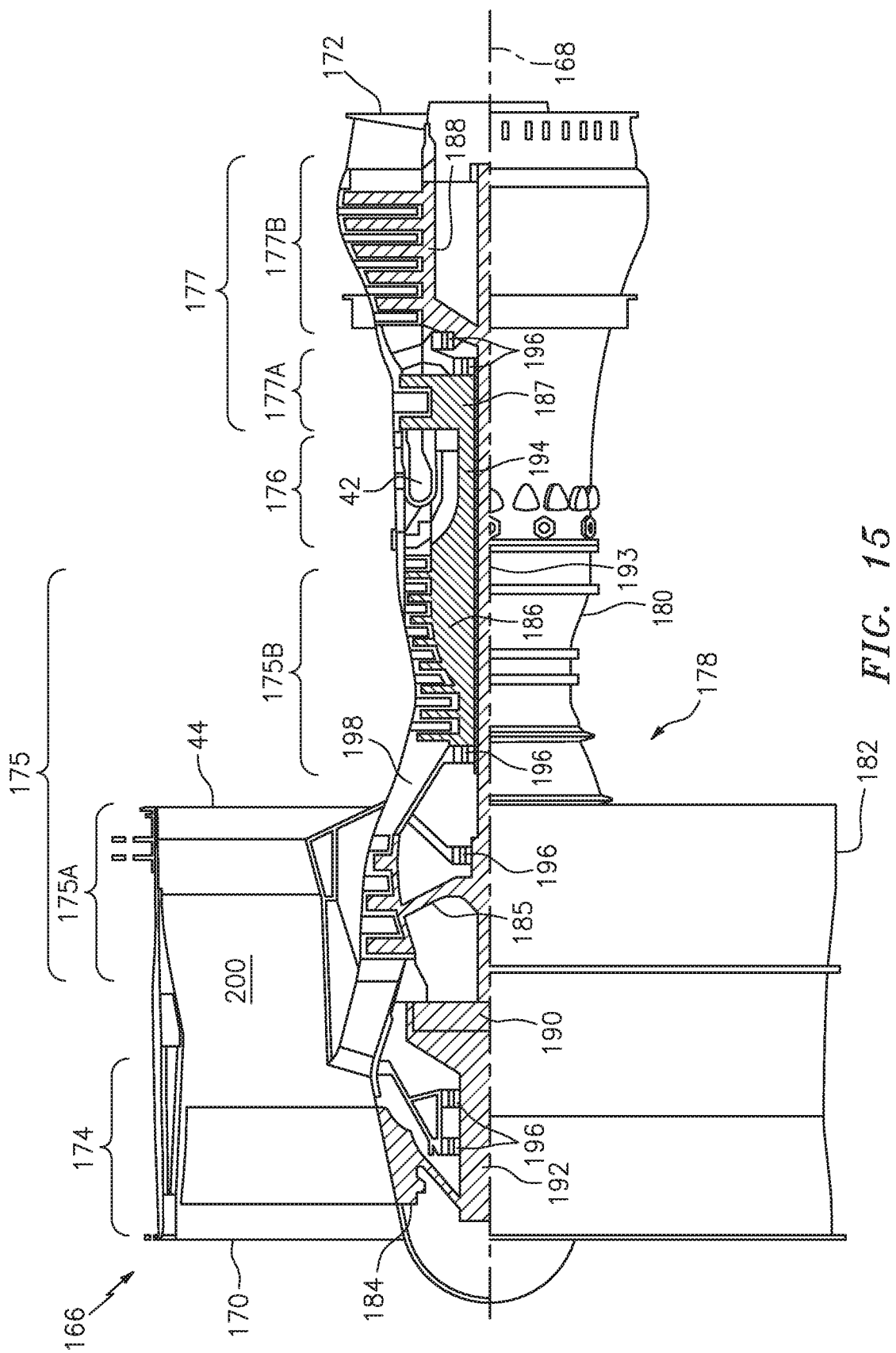
FIG. 15 is a side cutaway illustration of a gas turbine engine.

FIG. 15 is a side cutaway illustration of a geared turbine engine 166 which may be configured with the mount assembly 20. This turbine engine 166 extends along a rotational axis 168 between an upstream airflow inlet 170 and a downstream airflow exhaust 172. The turbine engine 166 includes a fan section 174, a compressor section 175, a combustor section 176 and a turbine section 177. The compressor section 175 includes a low pressure compressor (LPC) section 175A and a high pressure compressor (HPC) section 175B. The turbine section 177 includes a high pressure turbine (HPT) section 177A and a low pressure turbine (LPT) section 177B.

The engine sections 174-177 are arranged sequentially along the rotational axis 168 within an engine housing 178. This housing 178 includes an inner case 180 (e.g., a core case) and an outer case 182 (e.g., a fan case). The inner case 180 may house one or more of the engine sections 175-177; e.g., an engine core. The outer case 182 may house at least the fan section 174. The inner case 180 or the outer case 182 may include or be configured as the first component 22.

Each of the engine sections 174, 175A, 175B, 177A and 177B includes a respective rotor 184-188. Each of these rotors 184-188 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 184 is connected to a gear train 190, for example, through a fan shaft 192. The gear train 190 and the LPC rotor 185 are connected to and driven by the LPT rotor 188 through a low speed shaft 193. The HPC rotor 186 is connected to and driven by the HPT rotor 187 through a high speed shaft 194. The shafts 192-194 are rotatably supported by a plurality of bearings 196; e.g., rolling element and/or thrust bearings. Each of these bearings 196 is connected to the engine housing 178 by at least one stationary structure such as, for example, an annular support strut.

During operation, air enters the turbine engine 166 through the airflow inlet 170. This air is directed through the fan section 174 and into a core gas path 198 and a bypass gas path 200. The core gas path 198 extends sequentially through the engine sections 175-177. The air within the core gas path 198 may be referred to as "core air". The bypass gas path 200 extends through a bypass duct, which bypasses the engine core. The air within the bypass gas path 200 may be referred to as "bypass air".

The core air is compressed by the compressor rotors 185 and 186 and directed into a combustion chamber of a combustor in the combustor section 176. Fuel is injected into the combustion chamber and mixed with the compressed core air to provide a fuel-air mixture. This fuel air mixture is ignited and combustion products thereof flow through and sequentially cause the turbine rotors 187 and 188 to rotate. The rotation of the turbine rotors 187 and 188 respectively drive rotation of the compressor rotors 186 and 185 and, thus, compression of the air received from a core airflow inlet. The rotation of the turbine rotor 185 also drives rotation of the fan rotor 184, which propels bypass air through and out of the bypass gas path 200. The propulsion of the bypass air may account for a majority of thrust generated by the turbine engine 166, e.g., more than seventy-five percent (75%) of engine thrust. The turbine engine 166 of the present disclosure, however, is not limited to the foregoing exemplary thrust ratio.

The mount assembly 20 may be included in various turbine engines other than the one described above as well as in other types of rotational and non-rotational equipment. The mount assembly 20, for example, may be included in a geared turbine engine where a gear train connects one or more shafts to one or more rotors in a fan section, a compressor section and/or any other engine section. Alternatively, the mount assembly 20 may be included in a turbine engine configured without a gear train. The mount assembly 20 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A mount assembly, comprising:
a body configured with a bolt hole;
a bolt comprising a multi-point head and a shaft mated with the bolt hole;
a lock plate configured with a multi-point aperture and a slot, the multi-point aperture receiving the multi-point head, and the slot extending circumferentially about a centerline of the multi-point aperture within the lock plate;
a fastener projecting through the slot and fixed to the body;
a turbine engine case comprising a boss; and
a mounting bracket between the boss and the body;
wherein the bolt attaches the mounting bracket to the boss.

2. The mount assembly of claim 1, further comprising:
a second bolt comprising a second multi-point head and a second shaft mated with a second bolt hole in the body; and
a second lock plate configured with a second multi-point aperture and a second slot, the second multi-point aperture receiving the second multi-point head, and the second slot extending circumferentially about a centerline of the second multi-point aperture within the second lock plate;
wherein the fastener further projects through the second slot.

3. The mount assembly of claim 2, wherein the second lock plate is a mirror image of the lock plate.

4. The mount assembly of claim 1, wherein
the multi-point aperture has a cross-sectional geometry perpendicular to the centerline with a quantity N of points arranged circumferentially about the centerline;
the slot extends circumferentially about the centerline a quantity M of degrees within the lock plate; and
the quantity M is at least substantially equal to three-hundred and sixty divided by the quantity N.

5. The mount assembly of claim 4, a first of the points is circumferentially aligned with a center of the slot about the centerline.

6. The mount assembly of claim 1, wherein
the multi-point aperture has a cross-sectional geometry perpendicular to the centerline with a quantity N of points arranged circumferentially about the centerline;
the slot extends circumferentially about the centerline a quantity M of degrees within the lock plate;
the quantity M is at least substantially equal to three-hundred and sixty divided by a product of the quantity N and two.

7. The mount assembly of claim 1, wherein the multi-point aperture has a bi-hexagonal cross-sectional geometry.

8. The mount assembly of claim 1, wherein the fastener compresses the lock plate towards the body to prevent rotation of the lock plate.

9. The mount assembly of claim 1, wherein
the multi-point aperture has an axial centerline and a cross-sectional geometry with a quantity N of points arranged about the axial centerline;
the slot extends circumferentially about the axial centerline a quantity M of degrees within the lock plate and between opposing ends of the slot;
the quantity M is at least substantially equal to three-hundred and sixty divided by a product of the quantity N and a constant C; and
the constant C is equal to one or two.

10. The mount system of claim 9, wherein the constant C is equal to one.

11. The mount system of claim 9, wherein the cross-sectional geometry is a polygonal cross-sectional geometry.

12. The mount system of claim 9, wherein the cross-sectional geometry is a bi-hexagonal cross-sectional geometry.

13. The mount system of claim 12, wherein the quantity M is equal to between twenty-nine and thirty-one.

14. A mount assembly, comprising:
a body configured with a bolt hole;
a bolt comprising a multi-point head and a shaft mated with the bolt hole;
a lock plate configured with a multi-point aperture and a slot, the multi-point aperture receiving the multi-point head, and the slot extending circumferentially about a centerline of the multi-point aperture within the lock plate; and a fastener projecting through the slot and fixed to the body;

the body configured with a fastener aperture and a channel on a first side of the body;

the multi-point head adjacent a second side of the body;

the fastener comprising a lock bolt and a nut mated with the lock bolt; and the lock bolt comprising a lock bolt head and a lock bolt shaft, the lock bolt head mated with the channel, and the lock bolt shaft projecting out from the lock bolt head and sequentially through the fastener aperture and the slot to the nut.

15. The mount assembly of claim 14, further comprising:

a turbine engine case comprising a boss; and a mounting bracket between the boss and the body;

wherein the bolt attaches the mounting bracket to the boss.

16. A mount assembly for a turbine engine, comprising:

a body configured with a first bolt hole and a second bolt hole;

a first bolt comprising a first multi-point head and a first shaft mated with the first bolt hole;

a second bolt comprising a second multi-point head and a second shaft mated with the second bolt hole;

a first lock plate configured with a first multi-point aperture and a first lock aperture, the first multi-point aperture receiving the first multi-point head;

a second lock plate configured with a second multi-point aperture and a second lock aperture, the second multi-point aperture receiving the second multi-point head;

a fastener projecting through the first lock aperture and the second lock aperture, and the fastener attached to the body;

a turbine engine case comprising a boss; and a mounting bracket between the boss and the body;

wherein at least the first bolt or the second bolt attaches the mounting bracket to the boss.

17. The mount assembly of claim 16, wherein the first lock aperture has a circular cross-sectional geometry.

18. The mount assembly of claim 16, wherein the first lock aperture is configured as a slot that extends circumferentially about a centerline of the first multi-point aperture within the first lock plate.

19. The mount assembly of claim 18, wherein the first multi-point aperture has a cross-sectional geometry with a quantity N of points arranged circumferentially about the centerline;

the slot extends circumferentially about the centerline a quantity M of degrees within the first lock plate;

the quantity M is at least substantially equal to three-hundred and sixty divided by a product of the quantity N and a constant C; and the constant C is equal to one or two.

* * * * *